(12) United States Patent
Chen et al.

(10) Patent No.: US 10,086,873 B2
(45) Date of Patent: Oct. 2, 2018

(54) EXTRUDED MULTI-COMPONENT MOTOR VEHICLE SUB-FRAME

(71) Applicant: FORD GLOBAL TECHNOLOGIES, LLC, Dearborn, MI (US)

(72) Inventors: Xiaoming Chen, Canton, MI (US); David Anthony Wagner, Northville, MI (US); Gerald J. Heath, Allen Park, MI (US); Michael M. Azzouz, Livonia, MI (US); Tsung-Hsiun Li, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/989,454

(22) Filed: Jan. 6, 2016

(65) Prior Publication Data

US 2017/0190361 A1    Jul. 6, 2017

(51) Int. Cl.
*B62D 21/02* (2006.01)
*B60K 5/00* (2006.01)
*B62D 29/00* (2006.01)
*B62D 21/11* (2006.01)

(52) U.S. Cl.
CPC .............. *B62D 21/02* (2013.01); *B60K 5/00* (2013.01); *B62D 21/11* (2013.01); *B62D 29/008* (2013.01)

(58) Field of Classification Search
CPC ...... B62D 21/02; B62D 21/11; B62D 21/152; B62D 21/155; B62D 21/15; B62D 29/008; B62D 25/082; B62D 25/08; B62D 25/2018; B62D 25/00; B60K 5/00; B60G 2204/15

USPC ............... 296/204, 203.02, 187.09, 187.1; 180/312, 299; 280/124.109, 784
See application file for complete search history.

(56) References Cited

U.S. PATENT DOCUMENTS 6,299,240 B1 * 10/2001 Schroeder ............. B62D 21/02
                                                         296/203.01
7,520,514 B2    4/2009 Ogawa et al.
2011/0068619 A1 * 3/2011 Werner ................. B22D 19/00
                                                         301/127

(Continued)

FOREIGN PATENT DOCUMENTS

DE      102011011934 A1    2/2012
JP         2000177621 A    6/2000
JP            4732614 B2    7/2011

(Continued)

OTHER PUBLICATIONS

English machine translation of DE102011011934A1.

(Continued)

*Primary Examiner* — Keith J Frisby
(74) *Attorney, Agent, or Firm* — Frank MacKenzie; King & Schickli, PLLC

(57) ABSTRACT

A motor vehicle sub-frame is provided. That motor vehicle sub-frame includes a front cross member, a rear cross member and first and second side rails connected to the front and rear cross members at each side of the sub-frame. The side rails both include a first component having a first extrusion axis and a second component having a second extrusion axis. The first and second components are joined together so that the two components effectively form an at least partially closed or boxed construction providing enhanced bending and torsion resistances while minimizing component weight.

8 Claims, 7 Drawing Sheets

(56) References Cited

U.S. PATENT DOCUMENTS

2011/0133519 A1* 6/2011 Caliskan ................ B62D 21/02
296/204

FOREIGN PATENT DOCUMENTS

| KR | 20080018384 A | 2/2008 | | |
|----|---------------|--------|---|---|
| KR | 20080028103 A | 3/2008 | | |
| KR | 100825686 B1 | 4/2008 | | |
| WO | WO 2012113433 A1 * | 8/2012 | ............. | B62D 21/11 |

OTHER PUBLICATIONS

English machine translation of JP20001T7621A.
English machine translation of JP4732614B2.
English machine translation of KR100825686B1.
English machine translation of 20080018384KRA.
English machine translation of KR20080028103A.

* cited by examiner

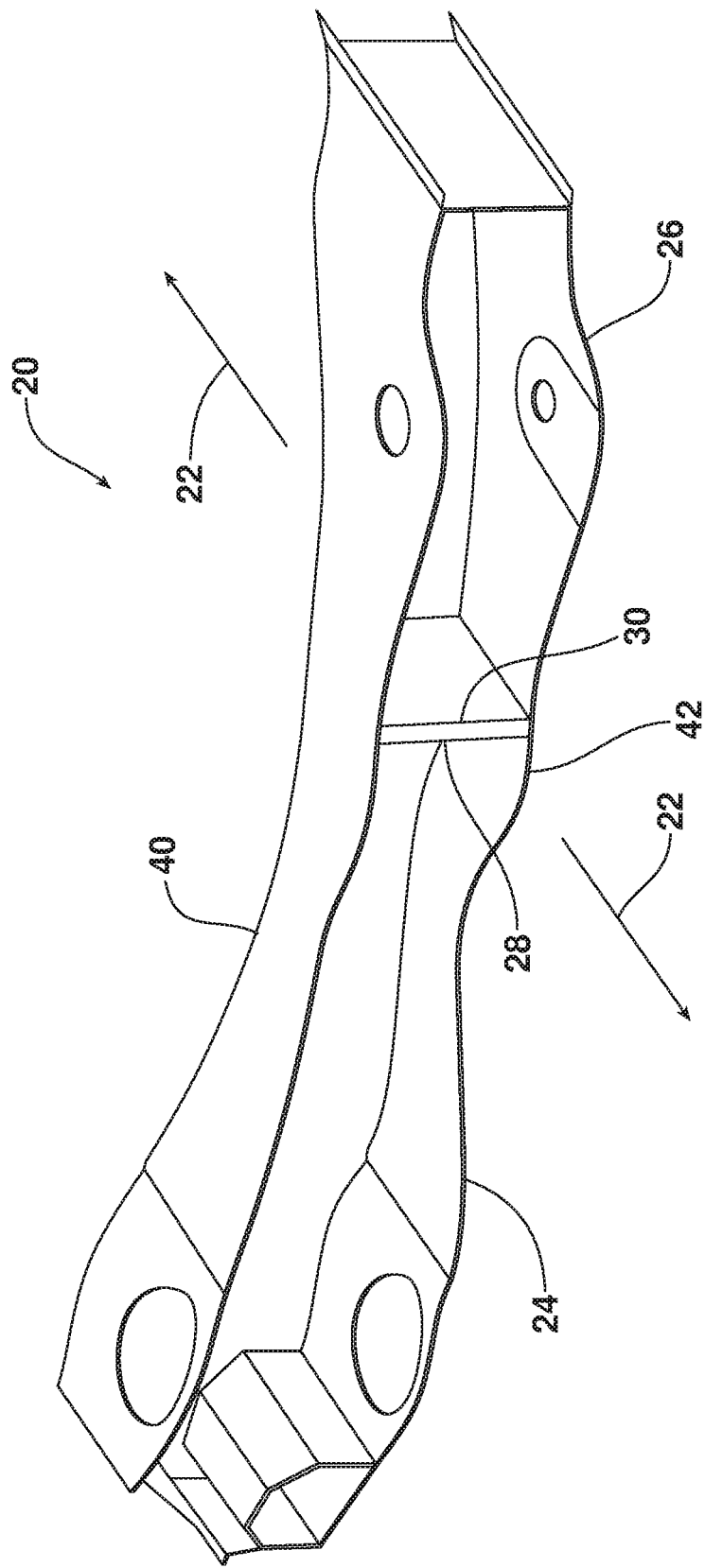

EXTRUDED MULTI-COMPONENT MOTOR VEHICLE SUB-FRAME

TECHNICAL FIELD

This document relates generally to the motor vehicle equipment field and, more particularly, to an extruded multi-component motor vehicle sub-frame as well as to an extruded side rail and extruded cross-member for that sub-frame.

BACKGROUND

The use of aluminum by the automotive industry could achieve over 30% weight savings in vehicle body, chassis and closure components when replacing steel parts. An aluminum intensive vehicle is an efficient way to reduce weight and thus improve fuel economy.

The sub-frame or engine cradle is an assembly with high potential for weight saving due to its size and weight. Conventional sub-frames are made of stamped steel parts. Some high performance automobiles utilize aluminum sub-frames made of aluminum castings or combinations of aluminum castings and extrusions. An aluminum sub-frame made by only extrusions is more attractive to automotive manufacturers since extrusion dies are more affordable compared to casting dies.

It is challenging to design a perimeter type sub-frame with only extrusions to achieve stiffness, performance and weight savings due to the architecture of the sub-frame and the manufacturing constraints of extrusions. More specifically, a perimeter type sub-frame is constructed with a front cross member, a rear cross member and two side rails. The most efficient stiffness design of the side rail should have a closed cross section or partially closed sections at critical locations that will benefit both bending and torsion resistances. Unfortunately, the package space of a sub-frame generally will not allow a straight side rail with a sufficient cross section size, thereby limiting the use of extruded tubes. Thus, in the past, package feasible side rail components have been made by either lateral direction or vertical direction extrusions which have two open surfaces.

This document relates to a new and improved motor vehicle sub-frame, a side rail for that sub-frame and a cross member for that sub-frame. Design challenges are overcome by providing an all extruded aluminum perimeter sub-frame that meets or exceeds strength, bending resistance and torsion resistance requirements while providing substantial weight savings for increased fuel economy. Thus, the motor vehicle sub-frame disclosed herein represents a significant advance in the art.

SUMMARY

In accordance with the purposes and benefits described herein, a motor vehicle sub-frame is provided. That motor vehicle sub-frame comprises a front cross member, a rear cross member, a first side rail connecting the front cross member with the rear cross member at a first side of the motor vehicle sub-frame and a second side rail connecting the front cross member with the rear cross member at a second side of the motor vehicle sub-frame. The first and second side rails both include a first component having a first extrusion axis and a second component having a second extrusion axis. The first component is joined to the second component with the first extrusion axis and the second extrusion axis forming an included angle of between 60° and 90°.

In one possible embodiment, the first component includes a first part and a second part wherein a first end of the first part is joined to a second end of the second part. In one possible embodiment, the second component includes a first element and a second element. The first element is joined to the inner surface of the first part and the second element is joined to the inner surface of the second part. Thus, the first component may include a first wall, forming an upper wall of the side rail and a second wall, forming a lower wall of the side rail. Further, the second component includes a third wall, forming an inner side wall of the side rail and a fourth wall, forming an outer side wall of the side rail. Accordingly, the second component may be positioned in the first component and the third wall and the fourth wall may be joined to the inner surfaces of the first wall and the second wall. In this way it is possible to produce at least a partially closed side rail from two extruded components.

In accordance with an additional aspect, a motor vehicle sub-frame is provided including a front cross member, a rear cross member and first and second side rails connecting the front and rear cross members at respective first and second sides of the motor vehicle sub-frame. The first side rail and the second side rail are joined to the rear cross member by one or more friction stir welds while the first side rail and the second side rail are joined to the front cross member by one or more MIG welds.

The motor vehicle sub-frame further includes a first front body attachment and a second front body attachment. The first front body attachment is joined to the first side rail by a first MIG weld and the second front body attachment is joined to the second side rail by a second MIG weld.

In accordance with still another aspect, a side rail is provided for a motor vehicle sub-frame. That side rail comprises a first component having a first extrusion axis and a second component having a second extrusion axis. The first component is joined to the second component with the first extrusion axis and second extrusion axis forming an included angle of between 60 and 90 degrees.

More specifically, the first component includes a first wall, forming an upper wall of the side rail, and a second wall, forming a lower wall of the side rail. The second component includes a third wall, forming an inner side wall of the side rail, and a fourth wall, forming an outer side wall of the side rail.

In one possible embodiment, the second component is positioned in the first component and the third wall and fourth wall are joined to the inner surfaces of the first wall and the second wall.

In another possible embodiment, the first component includes a first part and a second part wherein a first end of the first part is joined to a second end of the second part. In such an embodiment, the second component may include a first element and a second element. The first element is joined to an inner surface of the first part while the second element is joined to an inner surface of the second part. Thus, the second component at least partially closes the first component to provide and at least partially close the side rails. The first and second components may be joined by a weld.

In accordance with still another aspect, a cross member is provided for a motor vehicle sub-frame. That cross member comprises a hollow body having an extrusion axis and a wall having a first edge and a second edge. The wall is positioned inside and extends across the hollow body with the first edge and the second edge joined to the hollow body.

In one possible embodiment the wall has a longitudinal axis that extends parallel to the extrusion axis of the hollow body. Further the wall may be planar.

The hollow body may include an attachment hole and the wall is aligned with that attachment hole. Still further, a cylindrical reinforcement may be provided in the hollow body around the attachment hole. In such an embodiment, the wall may extend radially outwardly from the cylindrical reinforcement but the wall does not cross the attachment hole defined within the cylindrical reinforcement. Thus, the wall extending across the hollow body is discontinuous.

In the following description, there are shown and described several preferred embodiments of the motor vehicle sub-frame, the side rail for a motor vehicle sub-frame and the cross member for the motor vehicle sub-frame. As it should be realized, the motor vehicle sub-frame, side rail and cross member are all capable of other, different embodiments and their several details are capable of modification in various, obvious aspects all without departing from the sub-frame, side rail and cross member as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the motor vehicle sub-frame, the side rail for a motor vehicle sub-frame and the cross member for a motor vehicle sub-frame and together with the description serve to explain certain principles thereof. In the drawing figures:

FIG. 2A is a perspective view of a first component of a side rail including first and second parts that are joined end to end.

Reference will now be made in detail to the present preferred embodiments of the motor vehicle sub-frame, the sub-frame side rail and the sub-frame cross member, examples of which are illustrated in the accompanying drawing figures.

DETAILED DESCRIPTION

Figure 1:
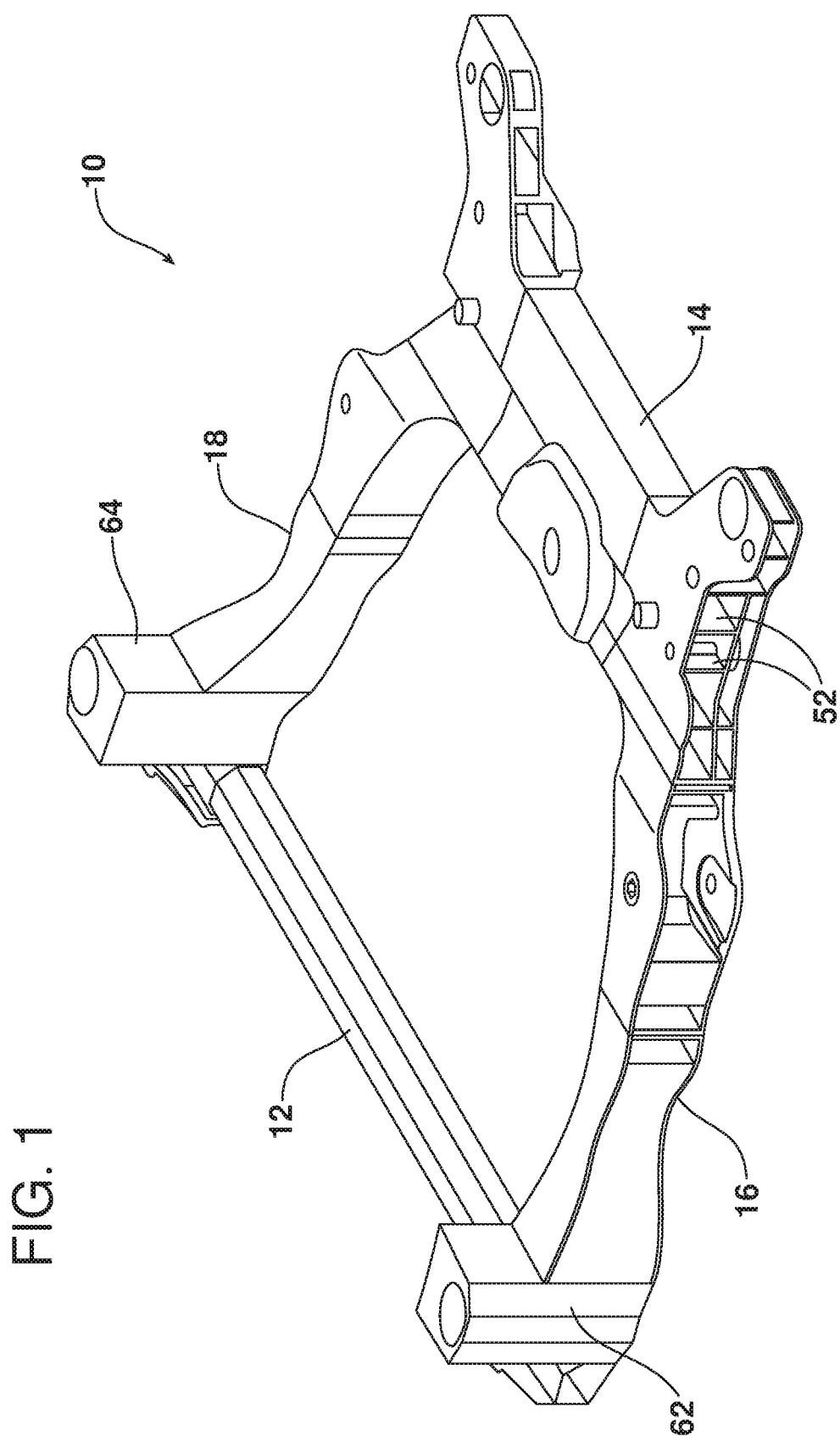
FIG. 1 is a perspective view of a first possible embodiment of the motor vehicle sub-frame.

Reference is now made to FIG. 1 illustrating a motor vehicle perimeter sub-frame or engine cradle 10. As illustrated, the sub-frame 10 includes a front cross member 12, a rear cross member 14, a first side rail 16 and a second side rail 18. The first side rail 16 connects the front cross member 12 with the rear cross member 14 at a first side of the motor vehicle sub-frame 10 while the second side rail 18 connects the front cross member with the rear cross member at a second side of the motor vehicle sub-frame.

The front cross member 12, has a shape of an irregular box with no side walls. The rear cross member 14 is also an irregular box with no side wall. As should be appreciated, the front cross member 12, the rear cross member 14 and the first and second side rails 16, 18 may all be made via extrusions of aluminum or aluminum alloy.

Reference is now made to FIGS. 2A-2D illustrating the construction of the two side rails 16, 18. More specifically, each side rail 16, 18 includes a first component 20. More specifically, the first component 20 illustrated in FIG. 2A includes a first part 24 and a second part 26. A first end 28 of the first part 24 is joined to a second end 30 of the second part 26 so that the two parts are welded end to end and the two parts have an extrusion axis extending parallel to the extrusion axis line 22.

Figure 2B:
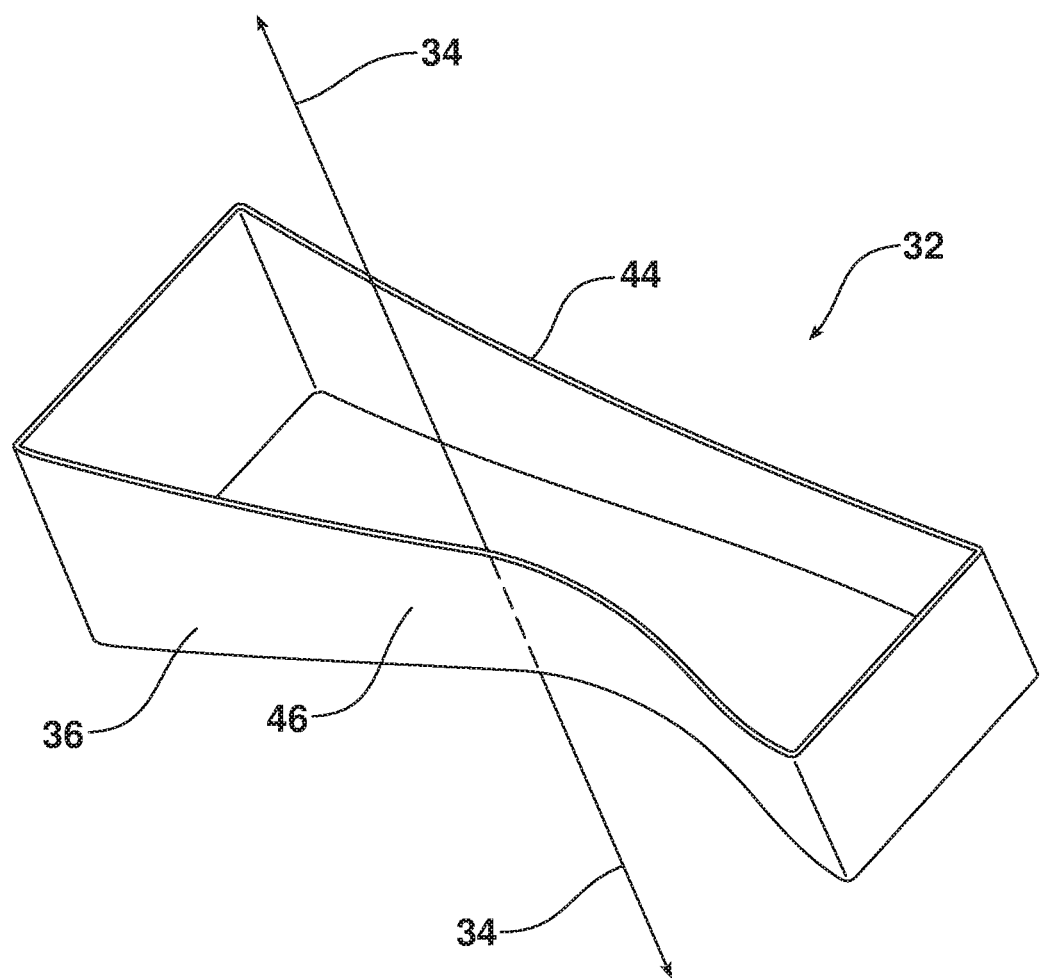
FIGS. 2B and 2C are perspective views illustrating first and second elements of a second component for a side rail of a motor vehicle sub-frame.
Figure 2C:
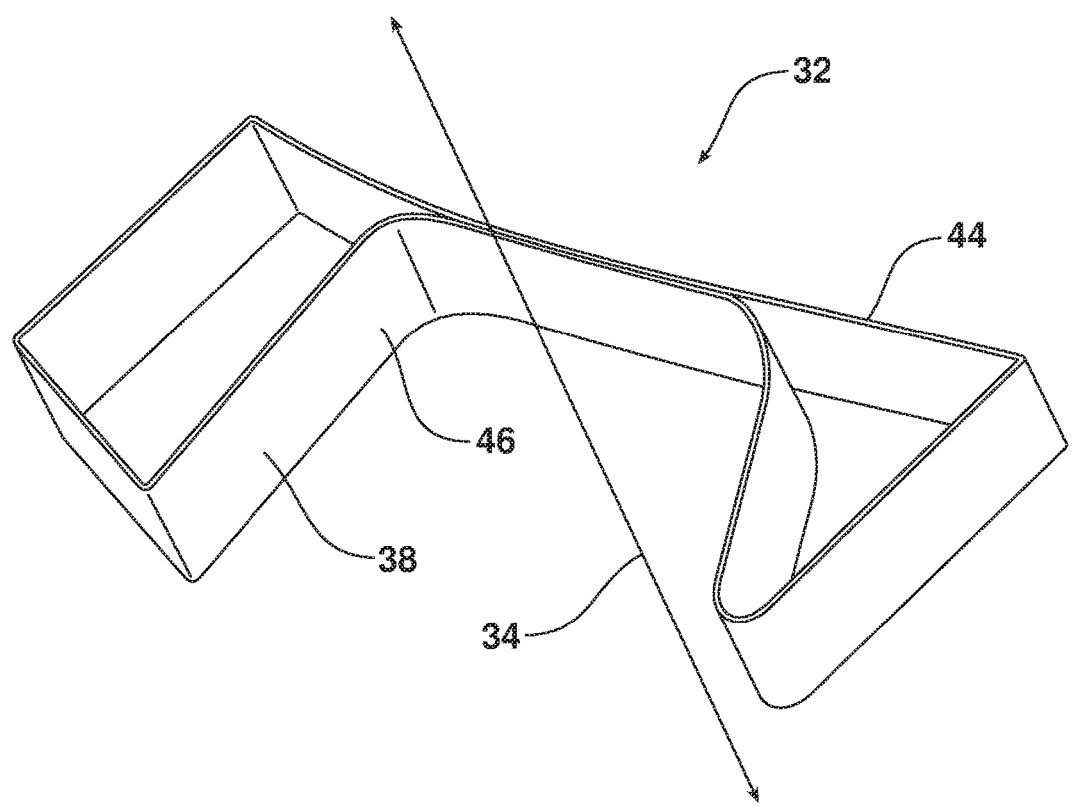

As illustrated in FIGS. 2B and 2C each side rail 16, 18 also includes a second component 32 having a second extrusion axis 34. The first element 36 of the second component 32 is illustrated in FIG. 2B while the second element 38 of the second component is illustrated in FIG. 2C.

Each side rail 16, 18 is constructed from the first and second component 20, 32. More specifically, the first component 20 includes a first wall 40 forming an upper wall of the side rail 16, 18 and a second wall 42 forming a lower wall of the side rail. The second component 32 includes a third wall 44 that forms an inner side wall of the side rail 16, 18 and a fourth wall 46 that forms an outer sidewall of the side rail.

Figure 2D:
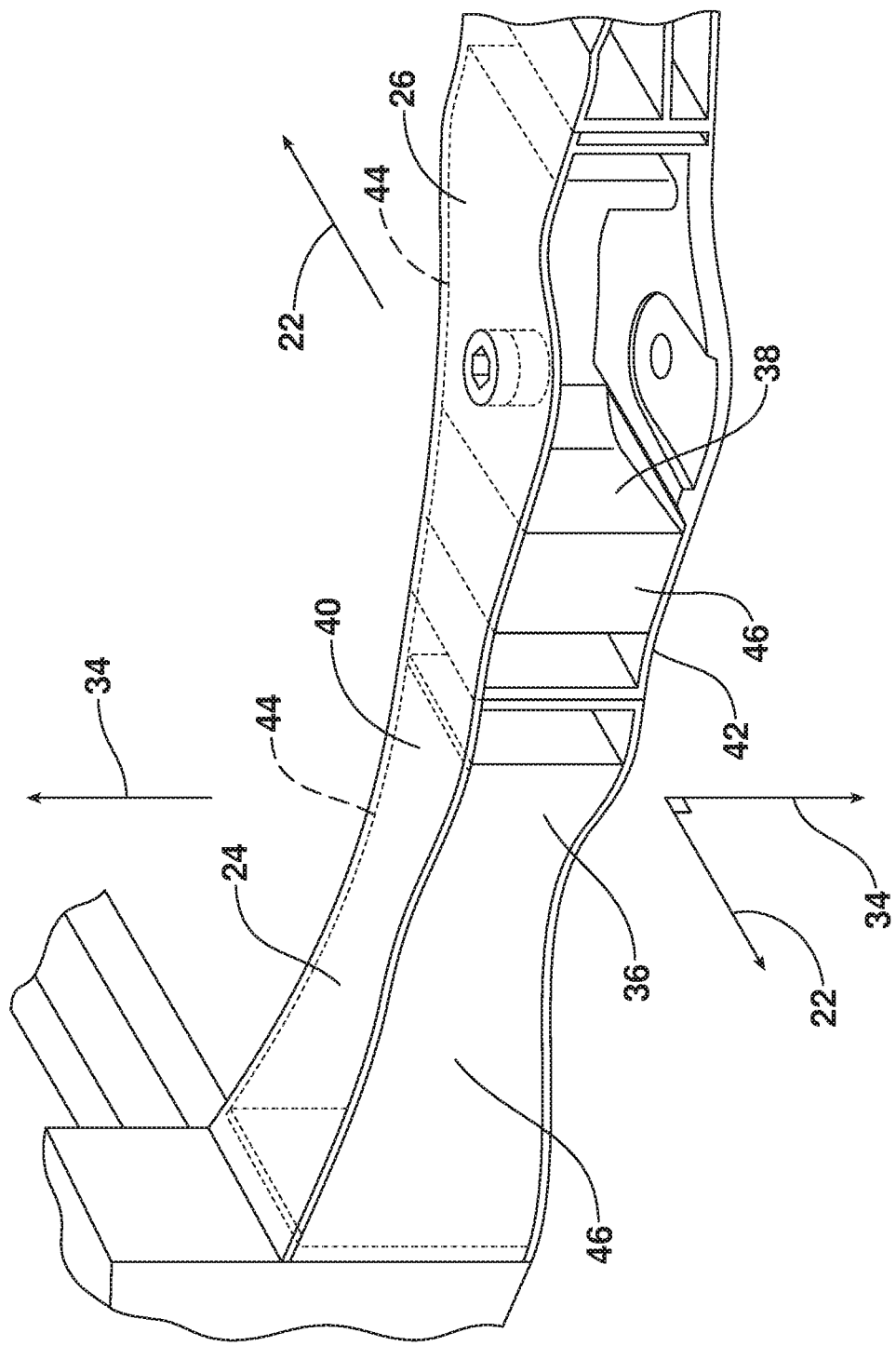
FIG. 2D is a perspective view illustrating the assembled side rail utilizing the components illustrated in FIGS. 2A-2C.

As best illustrated in FIG. 2D, the first element 36 is positioned inside the first part 24 while the second element 38 is positioned inside the second part 26. The third and fourth walls 44, 46 are then joined to the inner surfaces of the first and second walls 40, 42 by means of welding thereby providing at least partially closed side rails 16, 18 as best illustrated in detail in FIG. 2D. In one particularly useful embodiment of the motor vehicle sub-frame 10, the walls 40, 46 of the components 20, 32 are welded together by one or more friction stir welds. As best illustrated in FIG. 1, the first extrusion axis 22 of the first component 20 runs laterally while the second extrusion axis 34 of the second component 32 runs vertically in the assembled sub-frame 10. The two extrusion axes 22, 34 may form an included angle of between 60° and 90° or of between 70° and 90° or of between 80° and 90°. In the illustrated embodiment, the two extrusion axes 22, 34 are substantially perpendicular to one another.

Figure 3:
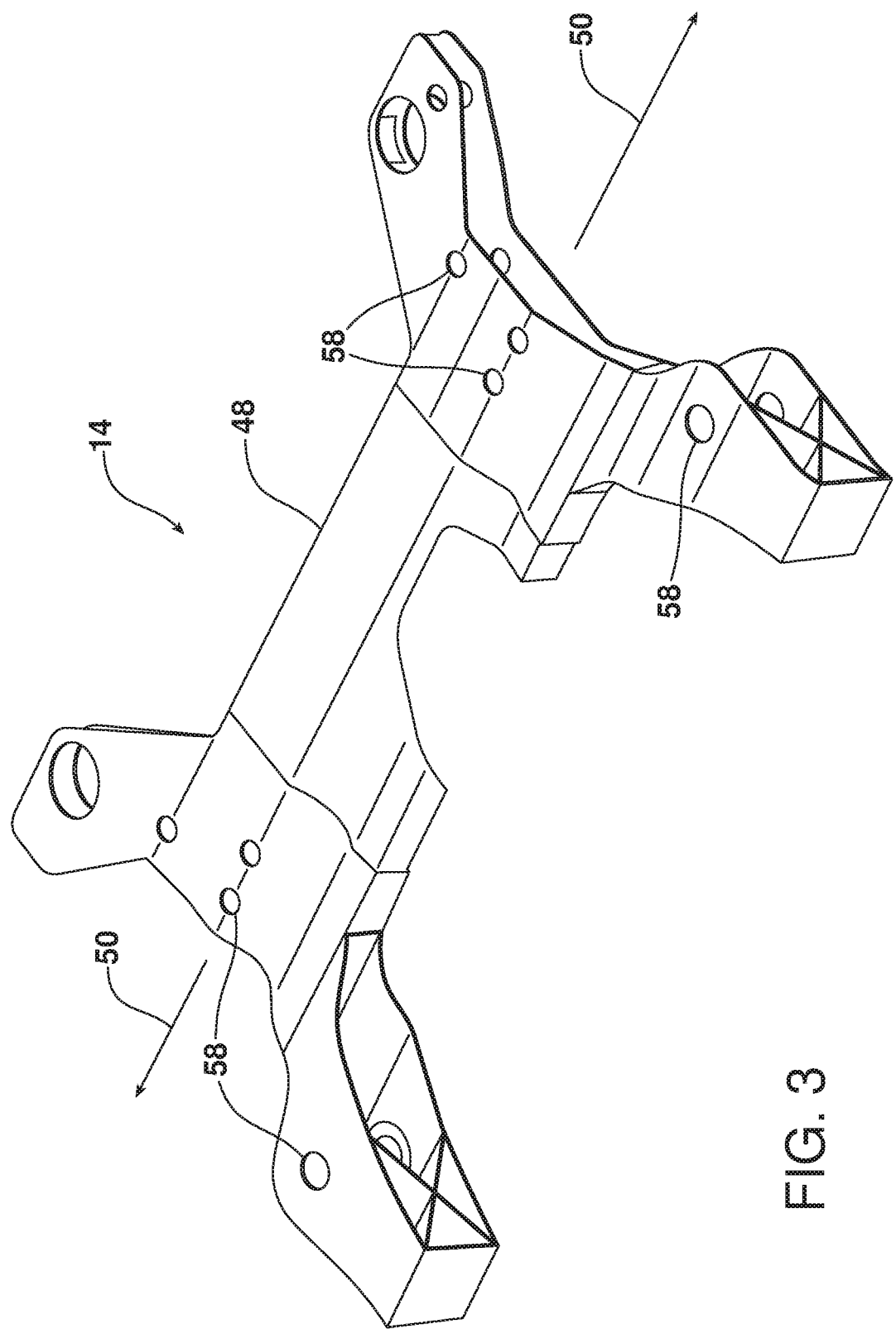
FIG. 3 is a perspective view of the rear cross member of the motor vehicle sub-frame.
Figure 4:
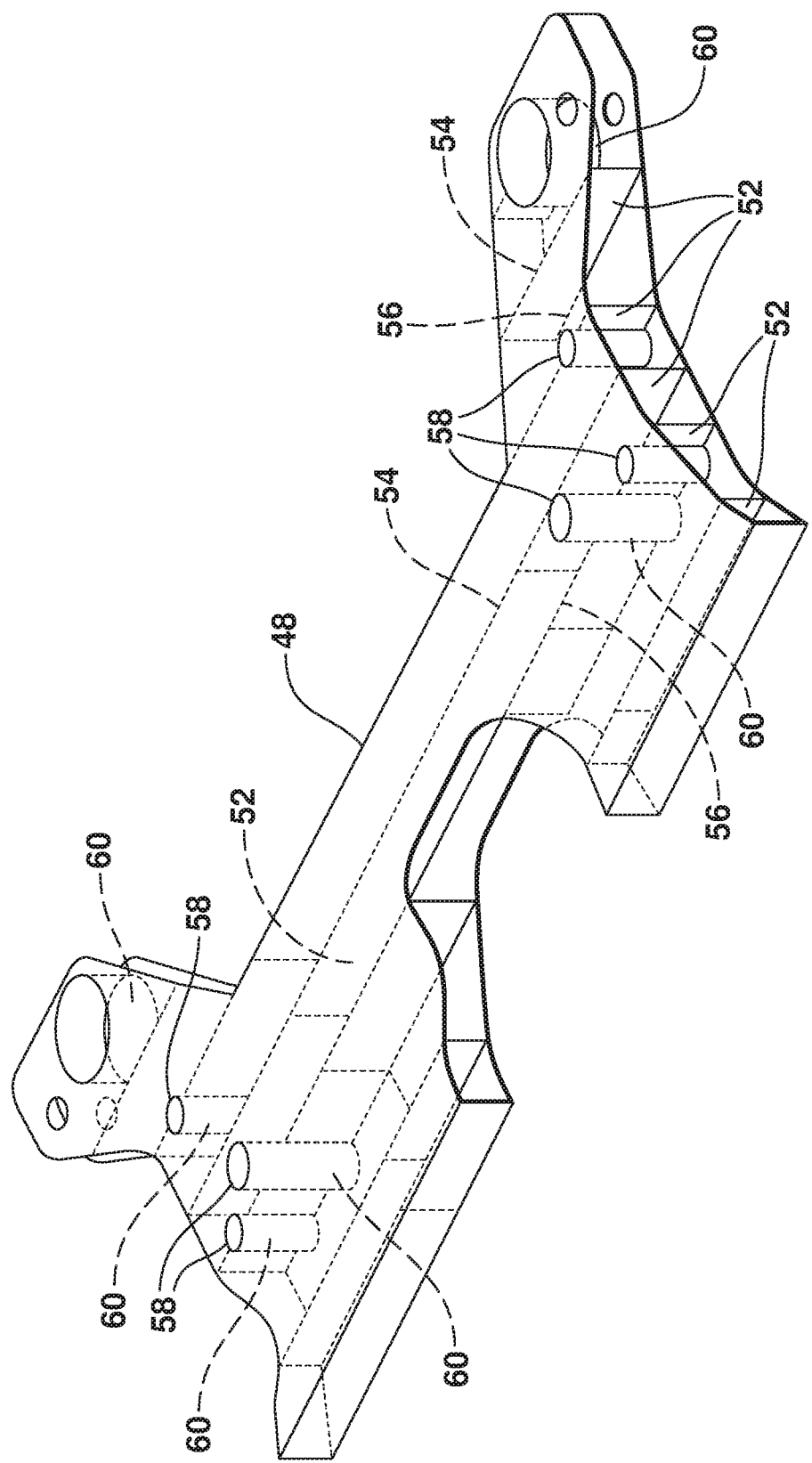
FIG. 4 is a detailed perspective view of that rear cross member illustrating the structural details of the cross member including the hollow body including various attachment holes, the cylindrical reinforcements for those attachment holes and the reinforcing walls, aligned with the cylindrical reinforcements and attachment holes, extending across the hollow body.

Reference is now made to FIGS. 3 and 4 illustrating in detail the rear cross member 14 of the sub-frame 10. As illustrated, the rear cross member 14 includes an extruded hollow body 48 having an extrusion axis 50 that extends laterally across the sub-frame 10. A series of walls 52 are positioned inside the hollow body 48 and extend across the hollow body. Each wall 52 includes a first edge 54 and a second, opposite edge 56 that are joined to the inner surface of the hollow body 48 by appropriate welds. In the illustrated embodiment, each wall 52 has a longitudinal axis that extends parallel to the extrusion axis 50 of the hollow body 48. Further each wall 52 is planar.

As further illustrated in FIGS. 3 and 4, the hollow body 48 includes various attachment holes 58 for, for example, rear body attachments, stabilizer bar attachments, lower control arm attachments and steering attachments. A cylindrical reinforcement 60 may be provided in the hollow body 48 to reinforce the hollow body around each attachment hole 58. As illustrated, a wall 52 may extend radially outwardly from each cylindrical reinforcement 60. Here it should be appreciated that the walls 52 are not continuous but extend up to and are welded to the cylindrical reinforcements 60, they do not cross the attachment hole 58 defined within the cylindrical reinforcements.

In summary, the sub-frame 10 provides a number of benefits and advantages. The sub-frame 10 provides a desired strength relying upon friction stir welds to assemble the components 20, 32 of the side rails 16, 18 together, the rear cross member components 48, 52, 60 together and to join the side rails, 16, 18 to the rear cross member components. In contrast, one or more MIG welds are utilized to join the front cross member 12 with the side rails 16, 18 through a first front body attachment 62 and second front body attachment 64 (see FIG. 1).

Further, the sub-frame 10 provides the desired bending and torsion resistances through the provision of side rails 16, 18 incorporating a first component 20 having a first extrusion axis 22 and a second component 32 having a second extrusion axis 34 joined together so that the two extrusion axes form an included angle of between 60 and 90 degrees. In one particularly useful embodiment, the two extrusion axes 22, 34 are substantially perpendicular to one another and provide an at least partially closed side rail.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A motor vehicle sub-frame, comprising:
   a front cross member;
   a rear cross member;
   a first side rail connecting said front cross member with said rear cross member at a first side of said motor vehicle sub-frame, said first side rail defining a first longitudinal axis; and
   a second side rail connecting said front cross member with said rear cross member at a second side of said motor vehicle sub-frame, said second side rail defining a second longitudinal axis;
   wherein said first side rail and said second side rail both include a first component having a first extrusion axis and a second component having a second extrusion axis and wherein said first component is joined to said second component such that the second component is positioned at least partially within the first component, wherein said first extrusion axis and said second extrusion axis forming an included angle of between 60° and 90°, and wherein the first extrusion axis and the second extrusion axis are different from both the first longitudinal axis and the second longitudinal axis.

2. The motor vehicle sub-frame of claim 1, wherein said first component includes a first part and a second part wherein a first end of said first part is joined to a second end of said second part.

3. The motor vehicle sub-frame of claim 2, wherein said second component includes a first element and a second element, said first element being joined to an inner surface of said first part and said second element being joined to an inner surface of said second part.

4. The motor vehicle sub-frame of claim 3, wherein said first component includes a first wall, forming an upper wall of said side rail, and a second wall, forming a lower wall of said side rail.

5. The motor vehicle sub-frame of claim 4, wherein said second component includes a third wall, forming an inner side wall of said side rail, and a fourth wall, forming an outer side wall of said side rail.

6. A motor vehicle sub-frame, comprising:
   a front cross member;
   a rear cross member;
   a first side rail connecting said front cross member with said rear cross member at a first side of said motor vehicle sub-frame; and
   a second side rail connecting said front cross member with said rear cross member at a second side of said motor vehicle sub-frame;
   wherein said rear cross member includes a hollow body having an extrusion axis and a wall having a first edge and a second edge, said wall being positioned inside and extending across said hollow body with said first edge and said second edge joined to said hollow body, and wherein said wall has a longitudinal axis that extends parallel to said extrusion axis; and
   wherein the hollow body includes at least one cylindrical reinforcement defining at least one attachment hole through the hollow body, wherein said wall extends radially outward from the at least one cylindrical reinforcement.

7. A motor vehicle sub-frame, comprising:
   a front cross member;
   a rear cross member;
   a first side rail connecting said front cross member with said rear cross member at a first side of said motor vehicle sub-frame, said first side rail defining a longitudinal axis; and
   a second side rail connecting said front cross member with said rear cross member at a second side of said motor vehicle sub-frame;
   wherein (a) said first side rail and said second side rail are joined to said rear cross member by a friction stir weld and (b) said first side rail and said second side rail are joined to said front cross member by a MIG weld; and
   wherein said first side rail includes a first extruded component having a first extrusion axis and a second extruded component having a second extrusion axis, said second extruded component at least partially within the first extruded component, and wherein the first extrusion axis and the second extrusion axis are different from the longitudinal axis of the first side rail.

8. The motor vehicle sub-frame of claim 7, further including a first front body attachment and a second front body attachment wherein said first front body attachment is joined to said first side rail by a first MIG weld and said second front body attachment is joined to said second side rail by a second MIG weld.

* * * * *